Figure 1:
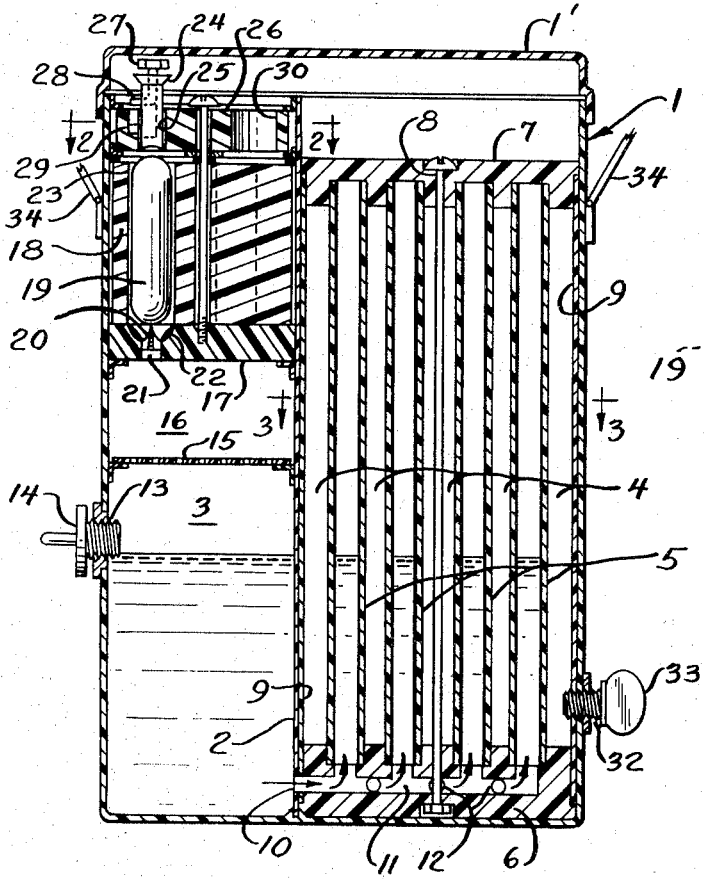

United States Patent [19]
Furukawa

[11] 3,850,815
[45] Nov. 26, 1974

[54] PORTABLE REVERSE OSMOSIS UNIT

[75] Inventor: David H. Furukawa, Poway, Calif.

[73] Assignee: Universal Oil Products Company, Des Plaines, Ill.

[22] Filed: Aug. 13, 1973

[21] Appl. No.: 387,880

[52] U.S. Cl.................. 210/321, 210/433, 210/456
[51] Int. Cl............................................. B01d 31/00
[58] Field of Search..................... 210/321, 456, 433

[56] References Cited
UNITED STATES PATENTS

| | | | |
|---|---|---|---|
| 3,421,628 | 1/1969 | Barnabe et al.................. | 210/321 X |
| 3,457,170 | 7/1969 | Havens........................... | 210/321 X |
| 3,565,256 | 2/1971 | Loeffler.......................... | 210/321 X |
| 3,567,031 | 3/1971 | Loeffler.......................... | 210/321 |

Primary Examiner—Frank A. Spear, Jr.
Attorney, Agent, or Firm—James R. Hoatson, Jr.; Philip T. Liggett; William H. Page, II

[57] ABSTRACT

A small portable purification unit provides for means to puncture a gas cartridge, such as a $CO_2$ capsule, and cause brackish water or other liquid, to be pressured from a reservoir section into and through a plurality of porous tubes which have been coated with a semipermeable osmotic membrane such that purified liquid can be withdrawn from a purified liquid collection section provided around the plurality of tubes.

7 Claims, 4 Drawing Figures

PATENTED NOV 26 1974           3,850,815

PORTABLE REVERSE OSMOSIS UNIT

The present invention relates to a small, light weight reverse osmosis unit which can be readily carried by an individual and thus serve as a means of converting contaminated water in remote areas into portable water.

More particularly, the present small unit incorporates means for carrying and puncturing pressurized catridges of inert gas, such as $CO_2$ (carbon dioxide) capsules which will cause the flow of a volume of stored liquid to be pressured through supported semipermeable osmotic membrane coatings and permit the collection of purified liquid which can be withdrawn as needed.

BACKGROUND OF THE INVENTION

Army personnel, persons hiking and camping, or people traveling into remote areas, have long needed a small portable water purification unit to provide themselves with small quantities of drinking water. A small unit to be carried on a life boat is also greatly desired in order that potable water can be made from sea water. It is realized that various types of filtering kits and small distillation units have been devised to provide portability and an emergency means for supplying drinking water to a person cut off from a fresh water supply; however, the reverse osmosis principal has not generally been incorporated or adapted into a small portable system. The use of the osmotic membrane and the pressuring of brackish water through such a membrane generally results in relatively pure water and thus a system which is of particular advantage when compared to many other types of apparatus or to other systems.

It is thus a principal object of this invention to provide a small compact and portable water treating unit which incorporates supported semipermeable osmotic membranes in order to obtain the benefits of a reverse osmosis separation procedure.

Inasmuch as there is the need to have suitable working pressure in an osmotic membrane system in order to exert pressure which is in excess of the osmotic pressure of the fluid, it is also an object of the present invention to incorporate a cartridge type of pressure means in the unit in order to, provide for fluid flow from the liquid storage section into the filtering section and on through the semipermeable membrane means to a purified water collection section.

SUMMARY OF THE INVENTION

In one embodiment, the present invention provides a portable reverse osmosis purification unit, particularly suitable to produce potable water from contaminated water or brackish water, which comprises in combination; (a) a carrying container, (b) said container having a feed water storage section with fill means thereto and a purified water collection section with a water withdrawal means therefrom, (c) osmotic membrane coated porous separation means positioned internally in said container in a manner to serve as at least a wall portion of said water collection section, whereby purified water will discharge into such section, (d) fluid distributing means connecting between said feed water storage section and said membrane coated porous separation means to uniformly distribute feed water thereto, (e) a gas receiving section adjacent to and in communication with said storage section, (f) a gas cartridge holding section with at least one gas holding cartridge therein in communication with said gas receiving section, (g) a movable cartridge puncturing means adjacent to said gas cartridge holding section, whereby the actuating of said puncturing means will release pressurized gas from a cartridge therein and produce gas pressure on the liquid in said storage section to in turn force purified liquid through said membrane coated separation means into said water collection section of said container, and (h) means to replace gas cartridge in said container.

Various types of membrane materials and porous support materials may be utilized in the present apparatus. For example, the semipermeable osmotic membrane may comprise any substantially mono-molecular polymeric film of controlled permeability. Specific films may include, but are not limited to films of cellulose acetate, cellulose triacetate, cellulose propionate, polyvinyl alcohol, cellulose acetate-butyrate, ethyl cellulose methyl methacrylate, etc. The membranes may be precast or coated in place and supported or a suitable porous support member which will supply suitable structural rigidity to withstand the liquid pressure being exerted against the membrane surface. It is not necessary to have bonding of the membrane to the support structure; however, bonding may occur and can be desirable.

In a preferred arrangement the semipermeable membrane will be placed on and supported by permeable tubular members whereby a plurality of spaced coated tubular members will provide the desired surface area to accommodate the fluid to undergo osmotic separation. For example, suitable porous tubes with osmotic membranes are described in U.S. Pat. No. 3,457,170. It is, however, not intended to limit the present invention to a device which utilizes only tubular support members for accomodating the membrane and providing for the desired separation procedure. For example, a membrane may be placed as a precast membrane onto a flat, porous, stainless steel plate with a filtering paper or fabric interposed between the membrane and the plate. In another instance, the semipermeable membrane may be cast onto a porous support plate which has been formed by the heating and pressing of small, microphterical-form plastic or resin particles. In still another instance, the support material may comprise resin made of fibers which have been stacked, wound, woven, or otherwise manufactured into a multiple layer arrangement. In connection with the preferred tubular support member, glass fibers or rovings may be impregnated with resin and wound around a suitable mandrel to produce a hollow tubular form with good structural strength and rigidity. Typically, the porous tubualr members will be coated on the inside with cellulose acetate or other desired membrane material to, in turn, provide a tube suitable for reverse osmosis separation. However, where desired, tubular members may be coated on the outside such that the pressurized fluid flow is from the outside of the tubular member and the permeate is collected on the inside of each tube.

In accordance with the present invention, the semipermeable membranes, whether on flat surfaces or on tubular surfaces, will be positioned in a sectionalized portion of a carrying container such that the brackish water, or other fluid being separated, will be forced around and against the osmotic surfaces and the desired purified liquid will be collected in a zone which surrounds the plurality of tubular members or, alternatively, is in a zone adjacent the flat, porous surface in a manner to collect the permeate.

It is also a particular feature of the present invention to have portable pressurizing means through the utilization of one or more capsules which can be punctured to release pressurized gas against the stored liquid in order to push it against the semipermeable membranes to effect the desired osmotic separation procedure. It is not intended to limit the present invention to any one type of capsule or to any one specific pressurized gas. Nitrogen and chlorine capsules may also be utilized in place of a $CO_2$ cartridge. Actually, chlorine gas may be utilized to advantage in the present portable unit to effect the purification of contaminated waters in that by having the chlorine come into contact with the feed water there will be a tendency to keep the water from becoming foul. Additionally, the slightly acidic nature of dissolved chlorine in the resulting contacted wated and in the resulting purified permeate can adjust the pH to a desirable range.

Reference to the accompanying drawing and the following description thereof will serve to illustrate in a diagrammatic manner how a potable water purification unit may be constructed and operated to provide small quanities of potable water. Variations in construction, as well as additional advantageous features which may be obtained through the use of the present form of small portable type unit will also be set forth hereinafter in the following descriptive matter.

FIG. 1 of the drawing is a diagrammatic sectional elevational view through a carrying container indicating the internal arrangement permitting the pressurizing of stored brackish water through a pluraltiy of membrane coated tubes to produce purified water.

Figure 2:
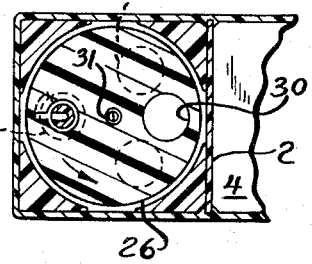
Figure 3:
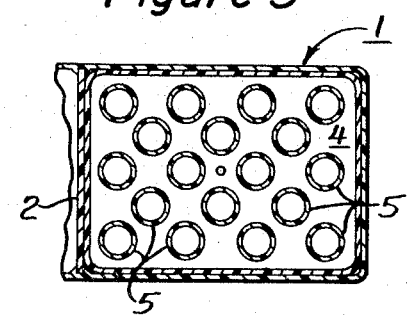

FIGS. 2 and 3 are partial sectional plan views through the unit, as indicated by the respective lines 2—2 and 3—3 in FIG. 1 of the drawing.

Figure 4:
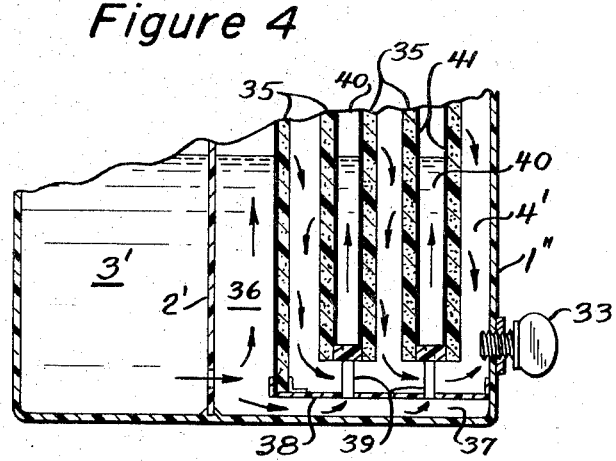

FIG. 4 is a partial sectional elevational view indicating a modified construction and arrangement where porous, flat plate members with membrane coatings are utilized in lieu of tubular form members.

Referring now particularly to FIGS. 1, 2 and 3 of the drawing, there is shown a small rectangular light weight container 1 which has a cover 1' and internal partitioning means 2 for separating a feed storage section 3 and a purified liquid collection section 4. The latter contains a plurality of spaced membrane coated porous tubes 5 so as to provide a relatively large amount of membrane surface area to, in turn, accommodate the stored water which will be subjected to osmotic separation when forced through the semipermeable membrane coatings which have been cast on the interior portions of each of the tubes 5. Such membranes are, of course, very thin and are not shown in the present drawing.

Various construction methods may be utilized to position and hold the tubular member 5 within the collection section 4; however, in the present instance, there is indicated the use of a lower fluid distributing header means 6 and upper header 7, each of which has socket-like portions to accommodate the plurality of spaced tubular members. There is also indicated the use of a central rod member 8 which can serve to clamp or tie together the respective headers 6 and 7 to, in turn, provide a sealed, liquid tight positioning of the tubes into a bundle-like arrangement. There is also indicated the utilization of a peripheral shell 9 which encompasses the plurality of tubes 5 and fits into off-set or shoulder-like portions around each of the tube holding headers 6 and 7 such that there is a resulting encased tube section that can be slipped down into the container 1 as a preconstructed unit.

It should also be noted that the lower header 6, as well as the partitioning 2 and the shell member 9, each have openings at 10 to provied liquid flow into passageway means 11. The latter can serve to distribute fluid into transverse passageways 12 such that the brackish water may be introduced into the entire plurality of tubular members 5. The liquid flow into the passageways 11 and 12 and thence into the interior of tubular members 5 will come from the adjacent reservoir section 3 which, in turn, can be filled through a port 13 having removable fill plug 14.

Various methods may be utilized to introduce the gaseous pressure from a punctured capsule above or in conjunction with the liquid stored in sectio 3; however, in the present arrangement there is provided a perforate diaphragm member 15 separating the liquid storage section 3 from a gas cavity 16 and a partitioning member 17 in turn separating the latter zone from an elongated capsule holding section 18. The latter shall be arranged to hold at least one capsule 19 in a manner such that it may be perforated and caused to expel pressurized gas into the cavity 16 and on into the storage zone 3 whereby there will be exerted pressure against the liquid and against each membrane coating within each porous tubular member 5. In the present instance, a sharp pointed puncturing member 20 is indicated as being supported across an opening 21 in partitioning 17 such that when the capsule 19 is pushed against the sharp end of the puncturing means 20, there will be the releasing of pressurized gas downwardly into the cavity 16 and thence into liquid reservoir section 3. In order to provide a gas seal above partition 17, suitable seating means 22 may be provided within the upper portion of the passageway 21 to, in turn, engage the lower end portion of capsule 19 and substantially preclude upward flow of gas through the opening 23 and longitudinally around capsule 19 in the holding section 18.

Again, various force producing means may be utilized to exert pressure against the top of the capsule 19 as an actuating means to effect the puncturiing of the lower end of the capsule and release gas therefrom. However, in the present instance, there is shown diagrammatically a movable plunger member 24 which has a slip fit into an opening 25 through a rotatable member 26 which is positioned adjacent to and superposed above the capsule holding section 18. Normally, with a thin rupture section at the end of a capsule, there may be the manual pushing of the plunger 24 against the top of capsule 19 to effect the puncturing at 20; although, in certain instances, it may be necessary to pound or otherwise exert a force greater than thumb pressrue, on plunger 24 to effect the desired puncturing operation. There is also indicated diagrammatically the use of a movable pin member 27 in the actuating plunger 24 which can serve to lock the latter in a downward engaged position against capsule 19 and thus hold its lower end against the sealing seat 22. In other words, the pin means 27 will rotate, push, or pull, in order to actuate a pin means at 28 to engage a slot 29 in member 26 and hold the actuating plunger 24 in a downward pressure-tight positioning against capsule 19.

As best shown in FIG. 2, as well as within FIG. 1, there can be a capsule removing passageway provided by the opening 30 in member 26 by virtue of permitting rotation of the latter around a central pin member 31 such that there is an alignment of opening 30 with the used capsule 19 to thus permit the removal of the latter and its replacement with a new capsule. Where desired, the capsule holding section 18 can also be made to be rotatable and additional capsules 19 stored therein such that they may be brought into alignment with the passageway 21 and the puncturing means 20 as needed. In other words, there is provided a reserve of capsules in the present portable container whereby capsules may be used sequentially to effect the desired pressuring of water through the membrane coated tubes. FIG. 2 indicates diagrammatically the storing of three capsules 19 within the storage section 18. There is also indicated a circular configuration for such section as well as for the plunger holding section 26 whereby the latter can be rotated around pin means 31 to effect the desired alignment of each section.

In a small, compact portable unit, it can be designed and constructed to merely hold perhaps one quart, or so, of brackish water and in turn produce perhaps a pint of drinking water in an approximate 1 to 2 minute period of time. Also, the entire carrying container and most of the internals can be fabricated of light weight fiber glass or plastic materials such that there is a resulting unit that will merely weigh in the range of about 5 to 10 pounds. Still further, where desired, suitable valving means may be provided for withdrawing liquid from the purified water collection section 4, such as at the lower outlet means 32; however, the present drawing merely indicates the utilization of a removable plug means 33 to permit withdrawal of purified water from the unit. There is also indicated the positioning of strap holding means 34 on each side of the container 1; however, handles on other carrying means may be provided.

With reference to FIG. 4 of the drawing, there is shown the ower portion of a container means such as 1'' having a fluid collection section 4' and a liquid outlet plug means 33' as well as internal partitioning 2' to separate a liquid reservoir section 3' from a collection section 4'. In this arrangement, spaced apart substantially flat porous support members 35 with semipermeable osmotic membranes 41 are positioned within the liquid collection section 4' to accommodate the brackish water being introduced from reservoir section 3' into passageway means 36 and 37. The latter being defined by a transverse partition member 38 in turn provided with openings and tubular passageway means 39 such that brackish liquid may be introduced into the narrow spaces 40 whereby feed water will become in contact with the membranes 41 on each of the support plates 35. Of course, where flat plate porous members are utilized in lieu of tubular form members, then such support members will typically have a greater thickness for the same type of material, in order to be structurally rigid and accommodate the fluid pressure to be exerted against the membrane and provide osmotic separation.

Obviously, still other forms of membrane support means and positioning arrangements may be utilized within any given small container and it is not intended to limit the present invention to merely those arrangements which have been indicated diagrammatically in the present drawing. Also, the flat membrane surfaces or tubular porous members may be arranged on a substantially horizontal position, rather than in the vertical arrangement as presently shown. While the portable unit described will generally find its greatest use for the purification of brackish water to produce small quantities of drinking water, it is also obvious that the same type of cartridge pressurized unit could well be used for effecting the osmotic separation of liquid mediums other than water.

I claim as my invention:

1. In a portable reverse osmosis purification unit having a multiple number of pressure recharging elements therein and suitable for the production of potable water from contaminated or brackish water, the combination comprising:
    a. a carryiing container having a vertically disposed feed water storage section having fill means thereto and a vertically disposed purified water collection section adjacent thereto and provided with a water withdrawl means therefrom;
    b. a plurality of vertically disposed osmotic membrane coated porous separation means positioned internally in said collection section and having pure water collection section disposed thereabout;
    c. fluid distributing means connecting said feed water storage section and said plurality of vertically disposed porous separation means thereby to uniformly distribute feed water thereto;
    d. a gas receiving section above and adjacent to and in communication with said feed water storage section;
    e. a gas cartridge holding section with at least one gas holding cartridge therein in communication with said gas receiving section, said cartridge holding section including a rotatable means having multiple cartridge holding passageways therein, one of said passageways having said communication with said gas receiving section, whereby upon discharge of one gas holding cartridge another of said cartridges may be rotated into position for discharge from said one of said passageways;
    f. a movable cartridge puncturing means adjacent to said one of said passageways whereby, upon actuation thereof, pressurized gas is released from the cartridge in said one of said passageways to produce gas pressure on the liquid in said storage section to in turn force purified liquid through said membrane coated separation means into said water collection section of said container; and
    g. means to replace gas cartridges in said container.

2. The portable purification unit of claim 1 further characterized in that said membrane coated porous separation means comprise spaced substantially flat members such that the osmotic membrane is in turn on a substantially flat surface to accommodate the separation of the water being pressurized thereagainst.

3. The portable purification unit claim 1 furhter characterized in that said membrane coated porous separation means comprise a plurality of internally coated spaced tubular members whereby the brackish water is pressurized against the internal surfaces of said tubular members to in turn permeate outwardly therethrough.

4. The portable purification unit of claim 3 further characterized in that said coated porous tubular members are formed of multiple layers of resin impregnated fibers which, in turn, provide structurally strong tubular members of desired porosity.

5. The portable purification unit of claim 1 further characterized in that said gas holding cartridge comprises carbon dioxide capsule means.

6. The portable purification unit of claim 1 further characterized in that said gas holding cartridge comprises chlorine gas capsule means.

7. The portable purification unit of claim 1 still further characterized in that said cartridge puncturing means is retained within said movable holding section and maintained adjacent to and in alignment with the movable cartridge holding section whereby said puncturing means can be moved to come in alignment with a selected gas cartridge in said cartridge holding section and, in addition, a cartridge removal passageway means is positioned in said movable member such that it may be brought into alignment with a selected gas cartridge to permit the insertion or removal of a cartridge into the cartridge holding section.

* * * * *